(12) United States Patent
Baser

(10) Patent No.: US 10,883,612 B2
(45) Date of Patent: Jan. 5, 2021

(54) CONTROL VALVE HAVING HOLLOW PISTON FOR CONTROLLING FLOW OF FLUID

(71) Applicant: Swapneshu Ashok Baser, Pune (IN)

(72) Inventor: Swapneshu Ashok Baser, Pune (IN)

( * ) Notice: Subject to any disclaimer, the term of this patent is extended or adjusted under 35 U.S.C. 154(b) by 0 days.

(21) Appl. No.: 16/080,678

(22) PCT Filed: Sep. 23, 2016

(86) PCT No.: PCT/IN2016/050321
§ 371 (c)(1),
(2) Date: Aug. 30, 2018

(87) PCT Pub. No.: WO2017/175234
PCT Pub. Date: Oct. 12, 2017

(65) Prior Publication Data
US 2019/0219176 A1   Jul. 18, 2019

(30) Foreign Application Priority Data

Apr. 7, 2016   (IN) .............................. 201621012384

(51) Int. Cl.
*F16K 3/26*   (2006.01)
*F16K 3/24*   (2006.01)

(52) U.S. Cl.
CPC ................ *F16K 3/26* (2013.01); *F16K 3/243* (2013.01)

(58) Field of Classification Search
CPC . F16K 3/26; F16K 3/243; F16K 3/262; F16K 3/316; F16K 3/22; F16K 3/24;
(Continued)

(56) References Cited

U.S. PATENT DOCUMENTS 174,344 A * 3/1876 Andrews .................... F16K 3/26
                                                137/625.38
1,977,565 A * 10/1934 Yarnall ...................... F16K 3/26
                                                251/325

(Continued)

*Primary Examiner* — Kelsey E Cary

(57) ABSTRACT

An embodiment herein provides a control valve having a hollow piston 104. The hollow piston 104 includes a hollow portion 106. The hollow portion 106 includes at least one opening 108 along the side wall of the hollow piston 104. The fluid from an inlet port 116 flows to an outlet port 118 through the at least one opening 108 within the hollow portion 106 along the side wall of the hollow piston 104, when the hollow piston 104 move upwards and the at least one opening 108 within the hollow portion 106 along the side wall of the hollow piston 104 is positioned above the topmost sealing ring 113. The effective flow rate through the control valve may be controlled depending on (a) the relative positioning of the opening 108 within the hollow portion 106 along the side wall of the hollow piston 104 with respect to the topmost sealing ring 113 and (b) the geometry and size of each of the at least one of opening 108 along the side wall of the hollow piston 104. When the control valve needs to be in tight shut off position, each of the at least one opening 108 within the hollow portion 106 along the side wall of the hollow piston 104 is moved below the bottommost sealing ring 111 to occlude the flow of fluid towards the outlet port 118 from the inlet port 116.

6 Claims, 5 Drawing Sheets

(58) Field of Classification Search
CPC .......... F16K 3/246; F16K 3/267; F16K 41/02;
F16K 41/04; F16K 27/041
See application file for complete search history.

(56) References Cited

U.S. PATENT DOCUMENTS

| | | | | | |
|---|---|---|---|---|---|
| 3,138,175 | A | * | 6/1964 | Chilcoat | F16K 1/54 |
| | | | | | 137/625.3 |
| 4,059,878 | A | * | 11/1977 | Jackson | B23P 15/001 |
| | | | | | 29/890.122 |
| 4,923,167 | A | * | 5/1990 | Schmidt | F16K 3/262 |
| | | | | | 123/323 |
| 2004/0145120 | A1 | * | 7/2004 | Faas et al. | F16K 3/243 |
| | | | | | 277/550 |
| 2006/0213564 | A1 | * | 9/2006 | Ricci | F16K 1/303 |
| | | | | | 137/625.48 |
| 2009/0057592 | A1 | * | 3/2009 | Lakhan | F16K 3/267 |
| | | | | | 251/318 |
| 2014/0166919 | A1 | * | 6/2014 | Webber | F16K 3/26 |
| | | | | | 251/344 |

* cited by examiner

CONTROL VALVE HAVING HOLLOW PISTON FOR CONTROLLING FLOW OF FLUID

BACKGROUND

Technical Field

The embodiments herein generally relate to a control valve, and, more particularly, to a control valve having a hollow piston for controlling flow of fluid.

Description of the Related Art

Fluid handling systems, such as chemical process systems, petroleum refining, etc. involve operations like heat transfer, mass transfer and reactions which typically utilize valves to control or otherwise regulate fluid flow. These fluid control devices may include a variety of different types, sizes, and configurations of valves, such as globe valves, ball valves with v-notch construction, gate valves, butterfly valves, plug valves etc. Several factors affect the design or choice of fluid control valves for any particular process application. As used herein fluid may encompass liquid, vapor, gas, or a combination of any of these fluid phases. For example, design consideration such as required flow characteristics, pressure drop across the valve, temperature, noise etc., may influence the type, size, and construction of any particular fluid control device chosen for a particular application. Fluid control valves of various types have been in extensive use for many decades.

The fluid control valves are used to control the flow of fluid and/or pressure across the valve by changing the effective opening (e.g., flow aperture) through the valve. The main problems faced with conventional control valves are that a high force is required for leak tight shut-off of the valves, and in case of dirty fluid service, it is difficult to achieve leak tight shutoff as there are chances for solid material from the flowing fluid to get trapped between sealing surfaces (e.g. seat and stem).

In case of control valves with V-notch ball design, high force is required for the spherical geometry of ball and mating seat to be pressed on each other for leak tight operation. In case of rotating plug type design, the soft sealing for rotating plug is prone to wear and tear. In case of globe valve design, the plug needs to be pressed hard against the seat for tight shutoff and this also makes the control of precise movement of plug difficult and jerky (e.g., especially near the close position). Thus, there is a need for a control valve that is suitable for high pressure applications, dirty service applications, which requires lower force for leak tight shutoff & enables smooth, non-jerky operation over entire stroke length, and has a simple geometry as well as sealing arrangement.

SUMMARY

In view of foregoing, an embodiment herein provides an apparatus for controlling flow of fluid. The apparatus includes a valve body, a hollow piston, a guide ring, and a plurality of sealing rings. The plurality of sealing rings includes a bottommost sealing ring, and a topmost sealing ring. The valve body includes an inlet port and an outlet port. The hollow piston is coupled to the valve body. The hollow piston includes a hollow portion surrounded by a side wall, and at least one opening within the hollow portion along the side wall of the hollow piston. The at least one opening is provided within the hollow portion along the side wall of the hollow piston. The guide ring is coupled to the hollow piston. The guide ring dispenses support to the hollow piston when the hollow piston moves linearly upwards or downwards inside the valve body. The topmost sealing ring that is coupled to the guide ring. The plurality of sealing rings occludes flow of fluid to the outlet port from the inlet port, so as to allow flow of fluid only through the hollow portion of the hollow piston. In one embodiment, the at least one opening within the hollow portion along the side wall of the hollow piston enables flow of fluid partially to the outlet port from the inlet port when the hollow piston is moved upwards until the at least one opening within the hollow portion along the side wall of the hollow piston is positioned partially above the topmost sealing ring. The apparatus further includes at least one gland packing ring, and an actuator assembly.

The at least one gland packing ring is coupled to the hollow piston to occlude leakage of fluid from the apparatus to the atmosphere during an operation of the valve. The actuator assembly is coupled to the hollow piston. The actuator assembly actuates the hollow piston upwards or downwards inside the valve body. In one embodiment, each of the at least one opening within the hollow portion along the side wall of the hollow piston enables full flow of fluid through the hollow portion towards the outlet port from the inlet port when the hollow piston is moved upwards until each of the at least one opening within the hollow portion along the side wall of the hollow piston is positioned fully above the guide ring and the topmost sealing ring. In another embodiment, the topmost sealing ring occludes a flow of fluid towards the outlet port from the inlet port when the hollow piston is moved downwards until each of the at least one opening within the hollow portion along the side wall of the hollow piston is positioned fully below the bottommost sealing ring. In yet another embodiment, the outlet port and the inlet port can be interchanged for reversing the flow direction of fluid.

In yet another aspect herein provides a method for controlling flow of fluid using a hollow piston. The method includes the following step of: (a) moving the hollow piston upwards, wherein the hollow piston includes at least one opening within a hollow portion along a side wall of the hollow piston, until the at least one opening within the hollow portion along the side wall of the hollow piston is positioned partially above the topmost sealing ring to enable flow of fluid partially to an outlet port from an inlet port; (b) moving the hollow piston upwards until each of the at least one opening within the hollow portion along the side wall of the hollow piston is positioned fully above the guide ring and the topmost sealing ring to enable flow of fluid fully through the hollow portion towards the outlet port from the inlet port; and (c) moving the hollow piston downwards until each of the at least one opening within the hollow portion along the side wall of the hollow piston is positioned fully below the bottommost sealing ring to occlude flow of fluid towards the outlet port from the inlet port of the control valve. The method further includes the step of: (d) pulling or pushing the hollow piston to move it upward or downward inside the control valve with help of an actuator assembly operated manually or by automation. In one embodiment, the topmost sealing ring also acts as the guide ring by dispensing support to the hollow piston when said hollow piston moves linearly upwards or downwards inside a valve body, and separate guide ring is not provided. In another embodiment, a sliding motion of the hollow piston through the topmost sealing ring wipes dirt on external surface of hollow piston, to avoid an entry of the dirt into a sealing area. In yet another embodiment, each of the at least one opening can be of various shapes or combinations of various shapes to achieve desired flow characteristics of the control valve.

The sliding motion of the hollow piston through the each of the plurality of sealing rings require lower operating force and enables smooth, non-jerky operation over the entire stroke length and restricts trapping of dirt material between sealing surfaces to help tight shutoff. Tight shut off of the control valve is achieved by simply sliding the hollow piston downwards to position each of the at least one opening within the hollow portion along the side wall of the hollow piston, below the bottommost sealing ring to occlude the flow of fluid completely. The minimum possible cavity of the hollow portion beyond the top most opening within the hollow portion along the side wall of the hollow piston minimizes dead volume inside hollow piston and helps in self-cleaning feature for valve during flow operation. The effective flow rate through the control valve may be controlled depending on (a) the positioning of each of the at least one opening within the hollow portion along the side wall of the hollow piston with respect to the topmost sealing ring, and (b) the geometry and size of each of the at least one opening within the hollow portion along the side wall of the hollow piston.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

Figure 1:
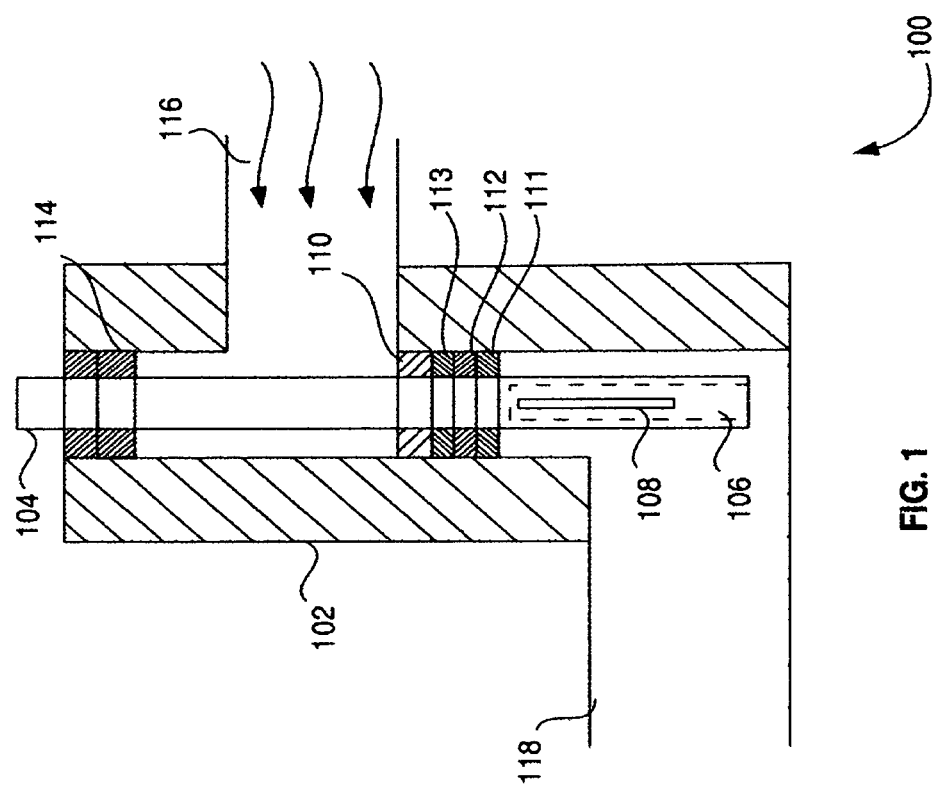
FIG. 1 illustrates a sectional view of the control valve that includes a hollow piston with an opening within a hollow portion along the side wall of the hollow piston, in a closed position according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there is need for control valve that is suitable for high pressure application, dirty service application, requires lower force for tight shutoff & enables smooth, non-jerky operation over the entire stroke length, and has simple geometry as well as sealing arrangement. The embodiments herein achieve this by providing a control valve having a hollow piston with a hollow portion. The hollow portion of the hollow piston includes at least one opening within the hollow portion along the side wall of the hollow piston. The fluid from an inlet port flows to an outlet port through the hollow portion and the opening within the hollow portion along the side wall of the hollow piston. The hollow piston valve can operate as bi-directional control valve with fluid flowing in either directions (e.g., flow over or flow under configuration). The flow rate of fluid can be varied to a desired amount or completely occluded based on the relative position of the opening within the hollow portion along the side wall of the hollow piston, with respect to the plurality of sealing rings inside the control valve. Referring now to the drawings, and more particularly to FIGS. 1 through 5, where similar reference characters denote corresponding features consistently throughout the figures, there are shown preferred embodiments.

FIG. 1 illustrates a sectional view 100 of a control valve that includes a hollow piston with an opening 108 within a hollow portion 106 along the side wall of the hollow piston 104, in a closed position according to an embodiment herein. The sectional view 100 of the control valve includes a valve body 102, a hollow piston 104, a hollow portion 106, at least one opening 108 within the hollow portion 106 along the side wall of the hollow piston 104, a guide ring 110, a plurality of sealing rings 111-113, and at least one gland packing ring 114. The plurality of sealing rings 111-113 may further includes a bottommost sealing ring 111, and a topmost sealing ring 113. The valve body 102 includes an inlet port 116, and an outlet port 118. The control valves further includes an actuator assembly (e.g., not shown in FIG). The outlet port 118 and the inlet port 116 are interchangeable with each other when flow direction of fluid across the control valve needs to be reversed. The hollow piston 104 includes the hollow portion 106. The hollow portion 106 includes the at least one opening 108 along the side wall of the hollow piston 104.

The at least one opening 108 within the hollow portion 106 along the side wall of the hollow piston 104 may be of any shape and size. The shape of the at least one opening 108 within the hollow portion 106 along the side wall of the hollow piston 104 may include but it is not limited to a rectangular shape, a circular shape, a square shape, a V-shape, or any other desired shape or combination of different shapes, and the like to suit the desired flow characteristics of the control valve. In one embodiment, the hollow portion 106 inside the hollow piston 104 serves as conduit for fluid flow from the inlet port 116 to the out let port 118. The actuator assembly (e.g., not shown in FIG) is adapted to move the hollow piston 104 in linear direction (e.g., up/down) to change the effective exposed area of the at least one opening 108 within the hollow portion 106 along the side wall of the hollow piston 104, for control of fluid flow rate across the inlet port 116 and the outlet port 118.

The actuation assembly may include but it is not limited to either mechanical or electric or pneumatic mechanism, or the like. In one embodiment, the actuator assembly pushes or pulls the hollow piston 104 with rotational motion to move linearly upward or downward inside the control valve. In another embodiment, the actuator assembly pushes or pulls the hollow piston 104 without rotational motion to move linearly upward or downward inside the control valve. The topmost sealing ring 113 is coupled to the guide ring 110. The topmost sealing ring 113 is adapted to occlude the flow of fluid to the outlet port 118 from the inlet port 116 so as to allow the flow of fluid only through the hollow portion 106 of the hollow piston 104. The at least one gland packing ring 114 is adapted to occlude the leakage of fluid from the control valve to the atmosphere during an operation of the control valve. The guide ring 110 provides support to the hollow piston 104 when the hollow piston 104 linearly moves upwards or downwards inside the control valve.

In one embodiment, the topmost sealing ring 113 can also work as the guide ring 110 without need for separate guide ring 110. In one embodiment, flow of fluid towards the outlet port 118 from the inlet port 116 is occluded when the hollow piston 104 is moved downwards until each of the at least one opening 108 within the hollow portion 106 along the side wall of the hollow piston 104 is positioned fully below the bottommost sealing ring 111.

Figure 2:
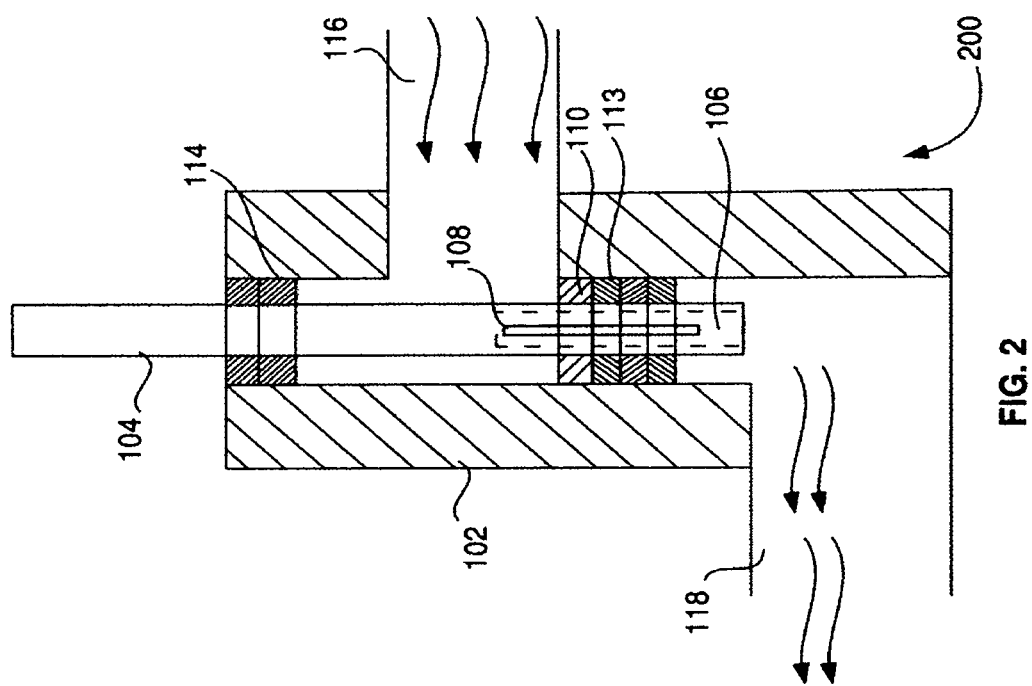
FIG. 2 illustrates a sectional view of the control valve of FIG. 1, in a partially open position according to an embodiment herein.

With reference to FIG. 1, FIG. 2 illustrates a sectional view 200 of the control valve of FIG. 1, in a partially open position according to an embodiment herein. The sectional view 200 shows that the control valve is in the partially open position. In one embodiment, the at least one opening 108 within the hollow portion 106 along the side wall of the hollow piston 104 enables flow of fluid partially to the outlet port 118 from the inlet port 116 when the hollow piston 104 is moved upwards until the at least one opening 108 within the hollow portion 106 along the side wall of the hollow piston 104 is positioned partially above the topmost sealing ring 113. The fluid may partially flow by entering through the exposed area of the at least one opening 108 within the hollow portion 106 along the side wall of the hollow piston 104 and exiting through the hollow portion 106 towards the outlet port 118. In one embodiment, the fluid can also flow from the outlet port 118 to the inlet port 116 (e.g., flow under configuration) when the flow direction through the control valve needs to be reversed.

Figure 3:
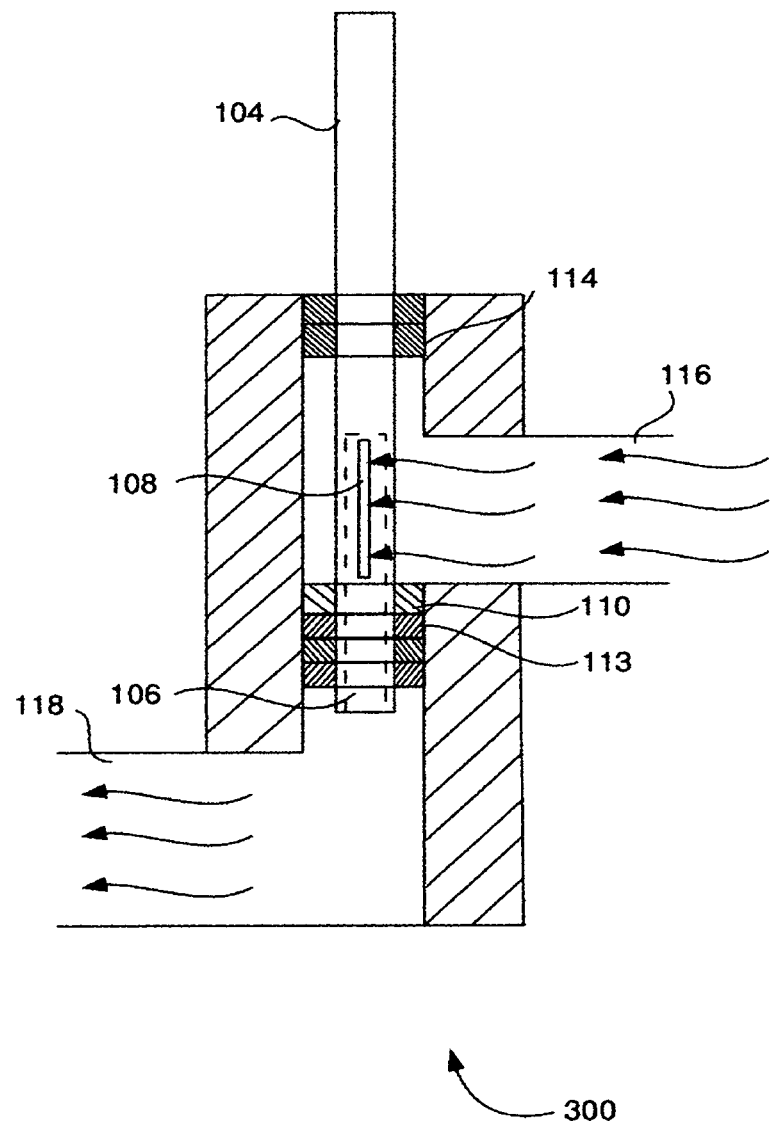
FIG. 3 illustrates a sectional view of the control valve of FIG. 1, in a fully open position according to an embodiment herein.
Figure 4:
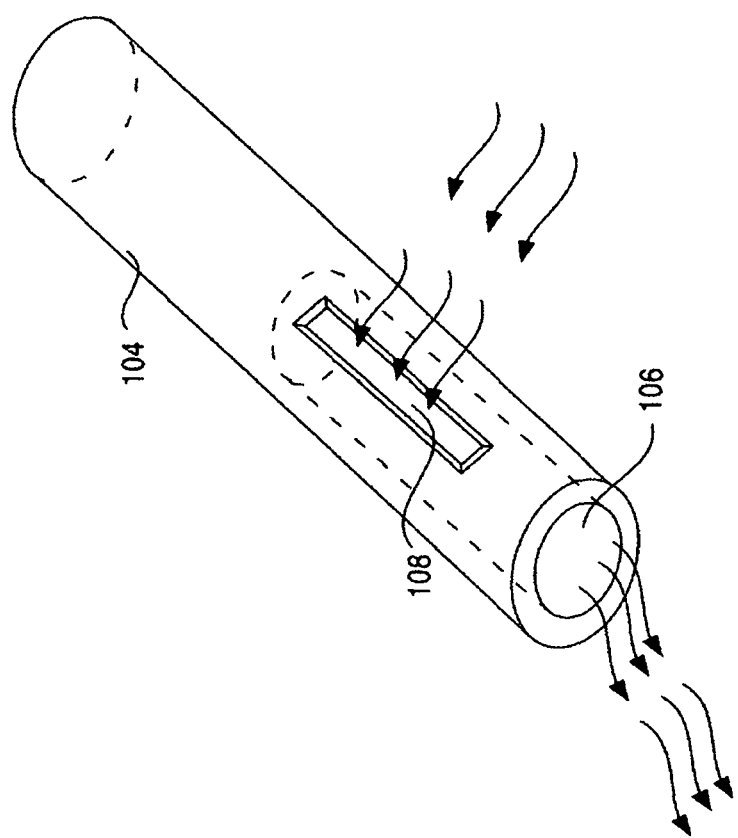
FIG. 4 illustrates an exploded view of the hollow piston of FIG. 1 according to an embodiment herein.

With reference to FIGS. 1-2, FIG. 3 illustrates a sectional view 300 of the control valve of FIG. 1, in a fully open position according to an embodiment herein. The sectional view 300 shows that the control valve is in fully open position. In one embodiment, each of the at least one opening 108 within the hollow portion 106 along the side wall of the hollow piston 104 enables flow of fluid through the hollow portion 106 towards the outlet port 118 from the inlet port 116 when the hollow piston 104 is moved upwards until each of the at least one opening 108 within the hollow portion 106 along the side wall of the hollow piston 104 is positioned fully above the guide ring 110 and the topmost sealing ring 113. The fluid may fully flow by entering through each of the at least one opening 108 within the hollow portion 106 along the side wall of the hollow piston 104 and exiting through the hollow portion 106 towards the outlet port 118. In one embodiment, the fluid can also flow from the outlet port 118 to the inlet port 116 (e.g., flow under configuration) when the flow direction through the control valve needs to be reversed.

With reference to FIGS. 1-3, FIG. 4 illustrates an exploded view of the hollow piston 104 of FIG. 1 according to an embodiment herein. The exploded view 400 includes the hollow piston 104, the hollow portion 106, and the at least one opening 108 within the hollow portion 106 along the side wall of the hollow piston 104. The fluid may flow by entering through the at least one opening 108 within the hollow portion 106 along the side wall of the hollow piston 104 and exiting through the hollow portion 106 towards the outlet port 118. In one embodiment, the fluid can also flow in a reverse direction by entering through the hollow portion 106 of the hollow piston 104 and exit through the at least one opening 108 within the hollow portion 106 along the side wall of the hollow piston 104. In another embodiment, the cavity of the hollow portion 106 ends immediately near the top most part of the at least one opening 108 within the hollow portion 106 along the side wall of the hollow piston 104, to avoid material accumulation in dead volume that would be created when the hollow portion 106 is extended beyond the top most part of the at least one opening 108 within the hollow portion 106 along the side of the hollow piston 104. In another embodiment, remaining part of the hollow piston 104 from the end of the hollow portion 106 remains as a solid piston.

Figure 5:
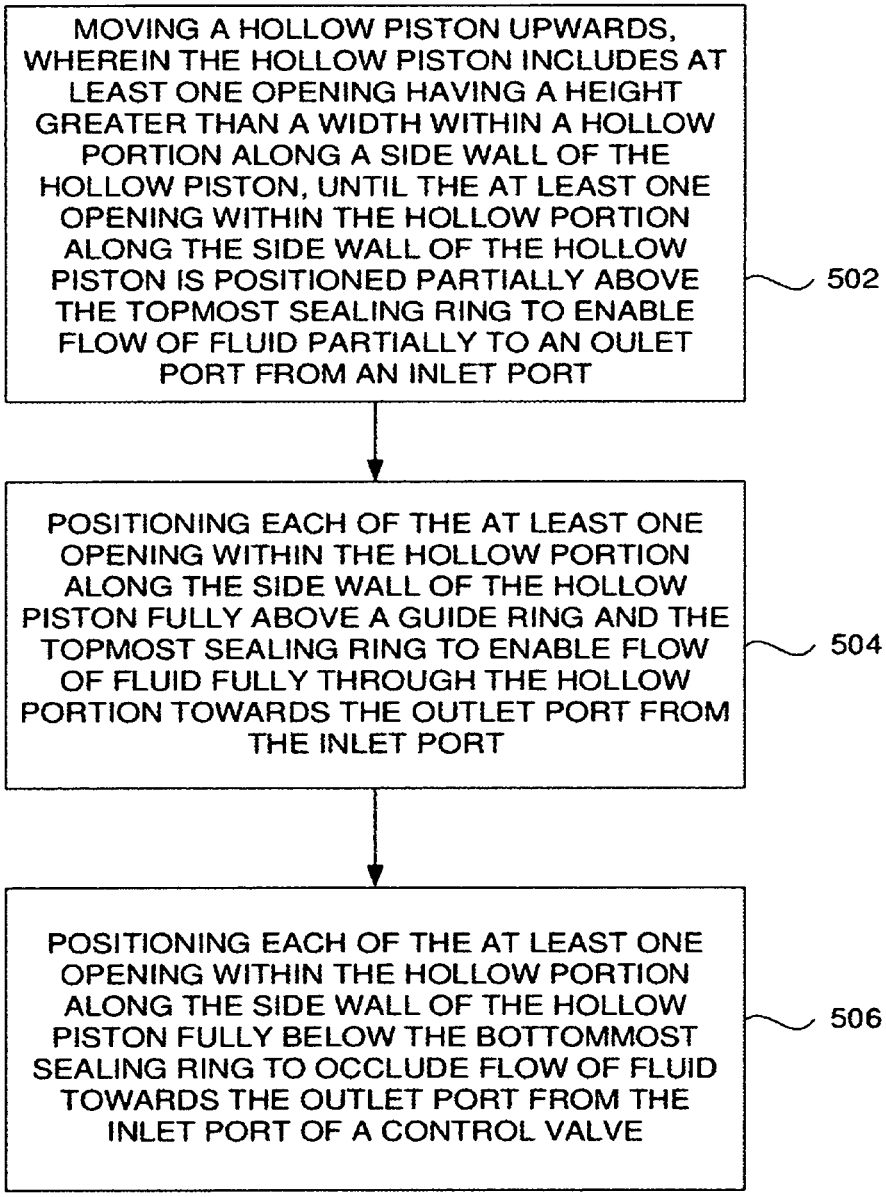
FIG. 5 illustrates a method for controlling flow of fluid of FIG. 1 according to an embodiment herein.

FIG. 5 illustrates a method for controlling flow of fluid of FIGS. 1-3 according to an embodiment herein. At step 502, the hollow piston 104 is moved upwards until the at least one opening 108 within the hollow portion 106 along the side wall of the hollow piston 104 is positioned partially above the topmost sealing ring 113 to enable flow of fluid partially to the outlet port 118 from the inlet port 116. At step 504, each of the at least opening 108 within the hollow portion 106 along the side wall of the hollow piston 104 is positioned fully above the guide ring 110 and the topmost sealing ring 113 to enable flow of fluid fully through the hollow portion 106 towards the outlet port 118 from the inlet port 116. At step 506, each of the at least one opening 108 within the hollow portion 106 along the side wall of the hollow piston 104 is positioned fully below the bottommost sealing ring III to occlude flow of fluid towards the outlet port 118 from the inlet port 116 of the control valve. The method further includes the step of: (a) the actuator assembly pulls or pushes the hollow piston 104 to move the hollow piston 104 upward or downward inside the control valve.

The foregoing description of the specific embodiments will so fully reveal the general nature of the embodiments herein that others can, by applying current knowledge, readily modify and/or adapt for various applications such specific embodiments without departing from the generic concept, and therefore such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

I claim:

1. An apparatus for controlling a flow of fluid, the apparatus comprising:
   a valve body (102) that comprises an inlet port (116) and an outlet port (118);
   a hollow piston (104) that is coupled to said valve body (102), wherein said hollow piston (104) comprises a hollow portion (106) surrounded by a side wall, and at least one opening (108) having a height greater than a width on said side wall of said hollow piston (104), wherein said hollow piston (104) enables a flow of fluid partially to said outlet port (118) from said inlet port (116);

at least one gland packing ring (114) that is coupled to said hollow piston (104) to occlude leakage of fluid from said apparatus to the atmosphere during an operation of said apparatus;

an actuator assembly that is coupled to said hollow piston (104), wherein said actuator assembly actuates said hollow piston (104) upwards or downwards inside said valve body (102);

a guide ring (110) that is coupled to said hollow piston (104), wherein said guide ring (110) dispenses support to said hollow piston (104) to move linearly upward or downward inside said valve body (102);

a plurality of sealing rings (111-113) that comprises a bottommost sealing ring (111) and a topmost sealing ring (113), wherein each of said plurality of sealing rings (111-113) occludes the flow of fluid to said outlet port (118) from said inlet port (116) so as to allow the flow of fluid only through said hollow portion (106) of said hollow piston (104), wherein the flow of fluid from said inlet port (116) to said outlet port (118) is enabled, when said hollow piston (104) is moved upward until said at least one opening (108) within said hollow portion (106) along said side wall of said hollow piston (104) is positioned partially above said topmost sealing ring (113), and the flow of fluid is dependent on a position of said at least one opening (108) with respect to said topmost sealing ring (113), wherein a sliding motion of said hollow piston (104) through said topmost sealing ring (113) wipes dirt to avoid an entry of said dirt into a sealing area, wherein said at least one opening (108) within said hollow portion (106) along said side wall of said hollow piston (104) enables the flow of fluid through said hollow portion (106) towards said outlet port (118) from said inlet port (116) when each of said at least one opening (108) within said hollow portion (106) along said side wall of said hollow piston (104) is positioned fully above said guide ring (110) and said topmost sealing ring (113), wherein said topmost sealing ring (113) occludes the flow of fluid towards said outlet port (118) from said inlet port (116) when each of said at least one opening (108) within said hollow portion (106) along said side wall of said hollow piston (104) is positioned fully below said bottommost sealing ring (111).

2. The apparatus as claimed in claim 1, wherein said outlet port (118) and said inlet port (116) is interchanged for reversing the flow direction of fluid.

3. A method for controlling a flow of fluid piston (104), wherein said method comprises:

moving said hollow piston (104) upwards, wherein said hollow piston (104) includes at least one opening (108) having a height greater than a width within a hollow portion (106) along a side wall of said hollow piston (104), until said at least one opening (108) within said hollow portion (106) along said side wall of said hollow piston (104) is positioned partially above a topmost sealing ring (113) to enable a flow of fluid partially to an outlet port (118) from an inlet port (116);

positioning each of said at least one opening (108) within said hollow portion (106) along said side wall of said hollow piston (104) fully above a guide ring (110) and the topmost sealing ring (113) to enable the flow of fluid fully through said hollow portion (106) towards said outlet port (118) from said inlet port (116); and positioning each of said at least one opening (108) within said hollow portion (106) along said side wall of said hollow piston (104) fully below the bottommost sealing ring (111) to occlude the flow of fluid towards said outlet port (118) from said inlet port (116) of a control valve, wherein the flow of fluid is dependent on a position of said at least one opening (108) with respect to said topmost sealing ring (113), wherein a sliding motion of said hollow piston (104) through said topmost sealing ring (113) wipes dirt to avoid an entry of said dirt into a sealing area.

4. The method as claimed in claim 3, wherein said method further comprises pulling or pushing, by an actuator assembly, said hollow piston (104) to move upward or downward inside the control valve.

5. The method as claimed in claim 4, wherein said topmost sealing ring (113) also acts as a guide ring by further dispensing support to said hollow piston (104) when said hollow piston (104) moves linearly upwards or downwards inside a valve body (102).

6. The method as claimed in claim 4, wherein each of said at least one opening (108) achieves desired flow characteristics of said control valve.

* * * * *